July 19, 1927.

A. ANZELEWITZ 1,636,671

HAND DEVICE FOR CUTTING AND POLISHING DIAMONDS

Filed June 25, 1925

WITNESSES

INVENTOR
ABRAHAM ANZELEWITZ
BY
ATTORNEYS

Patented July 19, 1927.

1,636,671

UNITED STATES PATENT OFFICE.

ABRAHAM ANZELEWITZ, OF NEW YORK, N. Y.

HAND DEVICE FOR CUTTING AND POLISHING DIAMONDS.

Application filed June 25, 1925. Serial No. 39,618.

This invention relates to a hand device for cutting and polishing diamonds.

An object of the invention is to produce a labor-saving device which can be handled satisfactorily by unskilled labor.

Another object is to produce a device which can be operated by unskilled labor and is so constructed and operated that the operator is positive that the diamonds will not be overground.

A further object is to provide a device in which a diamond, after it has been once set in position in the chuck, will not have to be reset until it is substantially entirely ground and polished.

The invention is illustrated in the drawings, of which—

Figure 1:
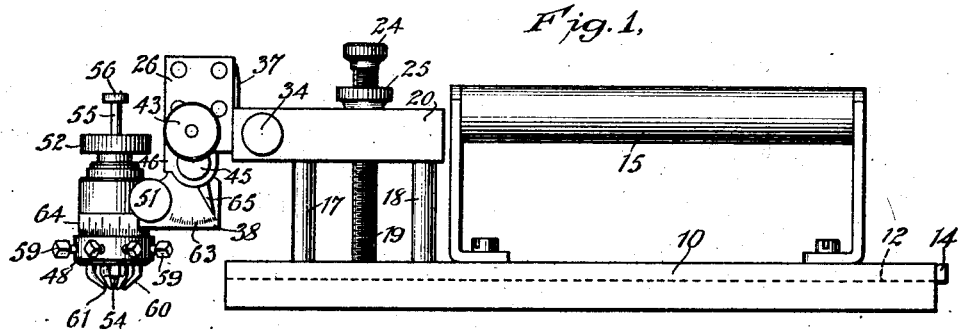
Figure 1 is a side elevation of the device.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention includes a fixed plate portion provided with a groove. This plate is adapted to be attached to a suitable table or support adjacent to a grinding device, which may be a rotatable disk on which grinding material has been disposed. A slidable plate provided with a suitable handle is disposed on the fixed plate. This slide plate is provided with an adjustable head plate which can be adjusted as to its height from the slide plate. Pivoted to the head is a chuck arm, and pivotally connected to the chuck arm is a chuck frame or support in which the chuck for holding the precious stone is mounted. Means are provided whereby the head can be swung with respect to the head plate over a desired angle and in a definite plane. Means are provided whereby the chuck-supporting arm can be swung over a desired angle in a plane at right angles to the plane in which the head is swung. Means are provided whereby the chuck-supporting frame mounted on the chuck arm can be rotated in a plane at right angles to the two previously mentioned planes. This combination of adjusting means for the head, the chuck arm and the chuck frame permits a wide latitude of adjustment whereby the jewel can be set in practically any desired position with respect to the grinding surface, so that by making the proper adjustments any surface of the jewel can be ground or polished without taking it out of the chuck and resetting it therein.

A further aspect of the invention comprises means for clamping the various movable parts in any adjusted position and means whereby the slide plate can be so adjusted with respect to the fixed plate. After a certain portion of the jewel has been ground no further grinding will take place by reason of the limitation of movement put on the slide plate.

A still further aspect includes a construction whereby the slide plate, after the grinding has taken place, can be used for polishing the diamond, and includes setting the diamond in any desired position and then lightly and rapidly moving the slide plate back and forth on the fixed plate so as to run the diamond across the polishing disk lightly and rapidly.

In the preferred form of the invention shown in the drawings, I provide a fixed plate 10 having a grooved upper surface 11 in which shoulders such as 12 are formed. This fixed plate is also provided with a hole 13 disposed near its forward end. This fixed plate is adapted to be fastened to any suitable table or support adjacent a grinding device, which may be a rotatable disk (not shown).

Disposed on the fixed plate is a slide plate 14 provided with a handle 15. This slide plate has at its forward end a pin 16 adapted in certain operations to be dependent into the hole 13 to prevent a sliding movement of the plate 14 under these conditions. The slide plate is provided with vertically extending fixed pins 17 and 18 and with a fixed screw stem 19. These pins and the stem are adapted to project through a head plate 20, the pins 17 and 18 projecting through apertures 21 and 22 therein, and the threaded stem 19 projecting through the threaded aperture 23. The top of the stem 19 is provided with a knob 24 and a clamping nut 25. By rotating the knob 24 the height of the head plate 20 above the slide plate 14 can be regulated. The engagement of the pins 17 and 18 with the head plate keep it in alignment with the slide plate 14.

Figure 2:
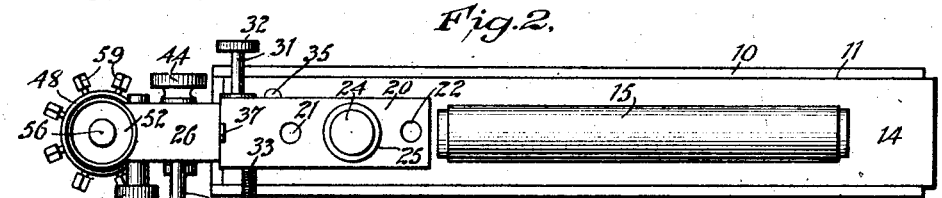
Fig. 2 is a plan view.

A head member 26 is pivoted at the forward end of the head plate 20. This head member is pivoted on a shaft 27 and extends partly into the head member and partly into a bore 28 formed in the end of the head plate 20. The shaft is provided with a bevel gear 29 thereon with which a bevel gear 30 meshes. This bevel gear 30 is mounted on a stem 31 extending to one side of the head plate 20 and provided with a knob 32 for manipulation thereof. By manipulating the knob 32 the gears are operated to move the head 26 angularly in a plane at right angles to the length of the head plate 20. After the head has been adjusted, a threaded stem 33 provided with a knob 34 is screwed in to clamp against the shaft 27, as shown in Fig. 4, to hold it in its adjusted position. A set screw 35, shown in Fig. 2, projects into an annular groove 36 near one end of the shaft 27 (see Fig. 3), to prevent any longitudinal movement of the shaft in the head plate 20. An indicator needle 37 is fixed against the end of the head plate 20 and a scale (not shown) is provided on the adjacent surface of the head 26 to indicate the degree of movement or variation in the adjustment of the head from the normal position.

Pivoted to the lower portion of the head 26 is a chuck arm 38. This chuck arm is pivoted on a shaft 39 for movement in a plane at right angles to the plane of movement of the head 26. The inner end of the chuck arm 38 is provided with a gear portion 40 adapted to be engaged by a gear 41 mounted on a shaft 42 provided with a knob 43. The manipulation of the knob 43 permits the rotation of the chuck arm in the above-mentioned plane. A knob 44 mounted on a shaft such as 45 extends through the head 26 and the end of the chuck arm 38 and is adapted to clamp the chuck arm between the side plates 46 and 47 of the head to hold the chuck arm in its adjusted position.

Figure 3:
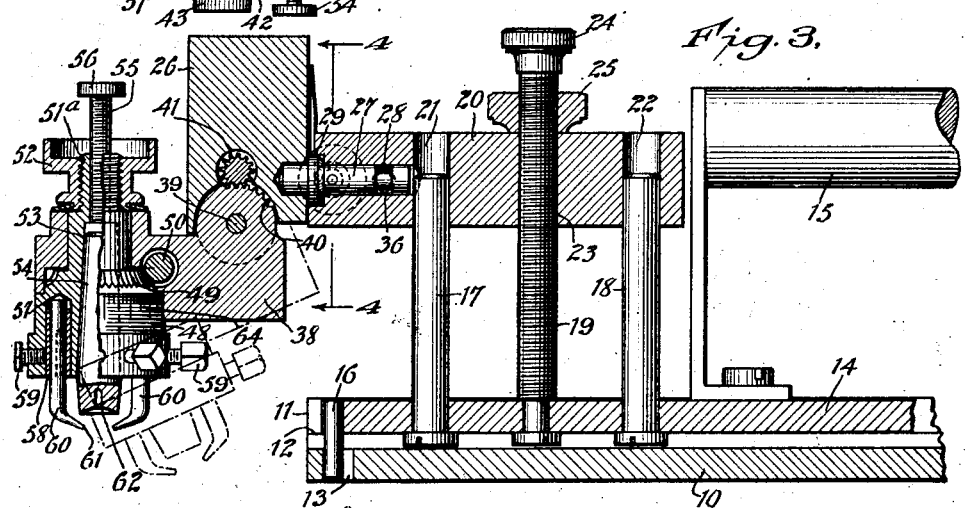
Fig. 3 is a vertical longitudinal cross section taken through the front end of the device and shown enlarged.
Figure 4:
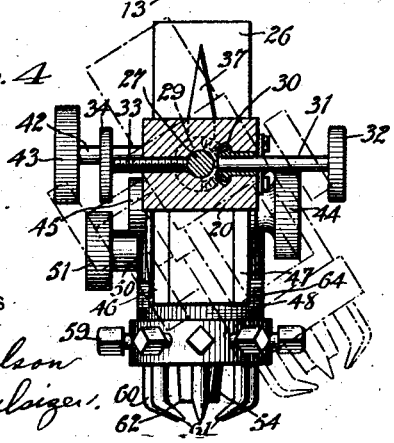
Fig. 4 is a section on the line 4—4 of Fig. 3.

Mounted on the end of the chuck arm 38 is a chuck frame (see Fig. 3). This frame is rotatably mounted in a suitable socket in the end of the chuck arm 38 and provided with gear teeth 49 engageable by a worm shaft 50 operated by a knob 51 so as to rotate the chuck frame 48 as desired. This rotation accurs in a horizontal plane, with the parts as shown in Fig. 3, which is at right angles to the two vertical planes in which the chuck arm 38 and the head 26 can be adjusted. The chuck frame at its upper end is provided with a threaded head 51$^a$ adapted to be engaged by a clamping screw 52 to clamp the chuck frame in any adjusted position. The chuck frame is provided with a socket 53 in which a chuck 54 is mounted. This chuck is tapered and fits tightly in the socket 53. In order to remove the chuck from the socket a threaded stem 55 is provided with a knob 56 which is adapted to screw down into the top of the head 51$^a$ of the chuck frame so as to bear, when desired, against the upper end of the chuck and to force it out of the chuck frame.

The chuck frame on its lower face is provided with a plurality of apertures, one of which is indicated by the numeral 57, and in these apertures a plurality of sleeves 58 are disposed. These sleeves are adapted to be fastened in the apertures 57 by means of set screws 59. These sleeves are adapted to receive jewel-engaging fingers 60 which are preferably provided with curved pointed lower ends 61. These fingers can be adjusted in the sleeves to any desired depth and can be rotated at any desired angles to properly engage the jewel which is held against a seat 62 in the end of the chuck 54. By properly disposing the jewel in the chuck and holding it in the desired position by means of the fingers 60 and then adjusting the chuck frame, the chuck arm, the head 26 and the head plate 20 as desired, the surface of the jewel can be disposed in the desired position with respect to a rotating grinding disk or device which is ordinarily disposed just beyond the end of the fixed plate 10.

After one surface of the diamond has been ground then it is necessary to make new adjustments of the parts to present another surface of the jewel to be ground. By reason of scales 63 and 64 on the chuck arm and the chuck frame, and the pointers 65 and 37 previously mentioned, the parts above mentioned can be adjusted with exactitude so that a high degree of accuracy is possible in the setting of the jewel, and skill on the part of the operator is not required provided he knows how to operate the device.

After all the surfaces of the diamond have been ground down to the desired extent, the diamond has to be polished and this procedure causes the diamond to have to be reset in the various positions in which it was set during grinding, but in this case the slide plate 14 is moved forward so as to remove the pin 16 from the aperture 13 whereby the pin will depend beyond the front end of the fixed plate 10 so that the plate 14 can be slid back and forth along the shoulders 12 of the fixed plate 10, and in thus sliding back and forth at a higher rate of speed a light polishing action is brought to bear on the jewel.

Figure 5:
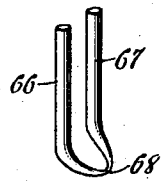
Fig. 5 is a perspective view of one form of finger for engaging the precious stones.

In Fig. 5 I show a form of finger which can be used when desired. This form comprises two finger stems 66 and 67 connected at their lower ends as at 68.

Thus, it will be seen that I have produced a single, unitary, simple, efficient device whereby an unskilled workman, provided he knows the operation of the device, can grind and polish precious stones with the high degree of accuracy and skill required to produce the finished perfect stone. The manipulations are simple and the various adjustments are so arranged that the highest degree of accuracy can be obtained. The danger of over grinding is absolutely eliminated, which removes one great defect in the present system of hand grinding whereby personal adjustments and skill of the operator is depended upon to know when the various surfaces have been ground enough.

What I claim is:—

1. A diamond grinding device, which comprises a slidable plate, a head plate slidably mounted thereon, a head pivoted to the forward end of the head plate, a chuck arm pivoted to the lower portion of the head, a chuck member mounted on the chuck arm, means for vertically adjusting the head plate with respect to the slide plate, means for adjusting the head with respect to the head plate, means for adjusting the chuck arm with respect to the head, and means for adjusting the chuck on the chuck arm.

2. A diamond grinding device, which comprises a slidable plate, a fixed plate having a groove in which said slidable plate is disposed, a head plate slidably mounted on said slidable plate, means for adjusting said head plate vertically with respect to the slidable plate, means for preventing lateral movement of the head plate with respect to the slidable plate, a head pivoted to the forward end of said head plate, means for adjusting the head with respect to the head plate in a plane at right angles to the length of the head plate, a chuck arm pivoted to the lower portion of the head, means for moving the chuck arm in a plane at right angles to the plane of movement of the head, a chuck mounted on the chuck arm, and means for adjusting the chuck in a plane at right angles to the two previously mentioned planes.

3. A diamond grinding device, which comprises a slidable plate, a fixed plate having a groove in which said slidable plate is disposed, a head plate slidably mounted on said slidable plate, means for adjusting said head plate vertically with respect to the slidable plate, means for preventing lateral movement of the head plate with respect to the slidable plate, a head pivoted to the forward end of said head plate, means for adjusting the head with respect to the head plate in a plane at right angles to the length of the head plate, a chuck arm pivoted to the lower portion of the head, means for moving the chuck arm in a plane at right angles to the plane of movement of the head, a chuck mounted on the chuck arm, means for adjusting the chuck in a plane at right angles to the two previously mentioned planes, and a plurality of means for clamping the head plate, the head, the chuck arm and the chuck in their adjusted positions.

4. A diamond grinding and polishing device, which comprises a fixed plate, a slidable plate adapted to be disposed thereon for slidable movement when desired, said fixed plate having an aperture therein, and a pin dependent from the slidable plate and adapted when desired to extend into said aperture to prevent the sliding movement of said slidable plate, or disengage from the fixed plates to permit of the sliding movement of said plates.

5. In a diamond grinding machine, a base, a slidable plate in the base, a head plate provided with a threaded opening, and with an opening at each side of the threaded opening, pins secured to the slidable plate and extending into openings of the head plate, a screw stem having one end mounted in the slidable plate and working in the threaded opening of the head plate, and means for locking the stem in position.

6. In a diamond grinding machine, a vertically adjustable head plate having a bore in its forward end, a head having a bore opposite the bore of said plate, a shaft mounted in the said bores, a bevel gear on the shaft, a stem mounted in the head plate, a bevel gear on the stem and meshing with the bevel gear of said shaft, and means for locking the shaft in its adjusted position.

7. In a diamond grinding machine, a bevel plate, a head adjustably pivoted to the said plate and having side plates, a chuck carrying arm having a gear portion, a shaft mounted in the side plates of the head and upon which the said chuck arm is pivoted, a shaft mounted in the head and provided with a handle, a gear on the last named shaft and meshing with the gear portion of said arm, and means for clamping the chuck arm between the plates of the head.

8. In a diamond grinding machine a pivotally mounted arm having a socket, a chuck frame mounted in the socket of the arm and having a conical socket and external gear teeth, means for securing the gear frame in said socket, a worm shaft mounted in the said arm and meshing with the gear teeth of the chuck frame, a chuck in the socket of the frame, and means for forcing the chuck out of the socket.

ABRAHAM ANZELEWITZ.